United States Patent
Maters et al.

(10) Patent No.: US 7,915,868 B1
(45) Date of Patent: Mar. 29, 2011

(54) METHOD OF SYNCHRONIZING A TURBOMACHINE GENERATOR TO AN ELECTRIC GRID

(75) Inventors: John C. Maters, Liberty, SC (US); John N. Cunningham, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/646,006

(22) Filed: Dec. 23, 2009

(51) Int. Cl.
*F02N 11/00* (2006.01)
*H02P 9/082* (2006.01)

(52) U.S. Cl. .............. 322/29; 322/10; 322/20; 322/59
(58) Field of Classification Search ............ 322/10, 322/20, 29, 37, 59; 290/52; 307/87
See application file for complete search history.

(56) References Cited

U.S. PATENT DOCUMENTS

| | | | |
|---|---|---|---|
| 3,562,545 A | 2/1971 | Rubner et al. | |
| 3,601,619 A | 8/1971 | Ringstad | |
| 3,621,278 A | 11/1971 | Rubner et al. | |
| 4,031,407 A * | 6/1977 | Reed | 307/87 |
| 4,032,793 A * | 6/1977 | Uram | 290/40 C |
| 4,118,635 A * | 10/1978 | Barrett et al. | 290/40 R |
| 4,439,687 A | 3/1984 | Wood et al. | |
| 5,493,201 A * | 2/1996 | Baker | 322/10 |
| 5,966,925 A * | 10/1999 | Torikai et al. | 60/778 |
| 6,333,622 B1 * | 12/2001 | Fogarty et al. | 322/90 |
| 6,960,900 B2 * | 11/2005 | Fogarty et al. | 322/29 |

FOREIGN PATENT DOCUMENTS

GB 1410525 A 10/1975

* cited by examiner

*Primary Examiner* — Nicholas Ponomarenko
(74) *Attorney, Agent, or Firm* — Dale J. Davis; Ernest G. Cusick; Frank A. Landgraff

(57) ABSTRACT

An embodiment of the present invention may seek to match the generator and grid voltages before the powerplant machine reaches the grid matching speed during the start-up process. An embodiment of the present invention may provide a predictive algorithm, or the like, to control the acceleration rate of the powerplant machine to target a particular phase angle differential between the powerplant machine and the grid when the powerplant machine reaches the grid matching speed. Here, the phase angle difference may be targeted such that a generator breaker may be closed immediately after the powerplant machine accelerates beyond the grid matching speed. This may avoid the generator experiencing a phase angle differential, which may add to the power transient associated with the generator breaker closure.

20 Claims, 3 Drawing Sheets

METHOD OF SYNCHRONIZING A TURBOMACHINE GENERATOR TO AN ELECTRIC GRID

BACKGROUND OF THE INVENTION

This application is related to commonly-assigned U.S. patent application Ser. No. 12/331,824, filed Dec. 10, 2008.

The present invention relates generally to the operation of a generator associated with a turbomachine, and more particularly, to a method of reducing the time to synchronize the generator to an electrical grid system (hereinafter "grid").

"Fast Start" and "Rapid Response" may be considered operating modes that require a turbomachine to export a load to a grid within a certain time after an operator initiates a start of that turbomachine. Fluctuating energy demand is a major factor in determining when the turbomachine operates. Turbomachines are commonly idled until sufficient demand requires operation. When demand requires operation, the turbomachine performs a start-up process before exporting the desired electricity.

Generally, a synchronization process requires that three parameters of the generator be within an acceptable range of the corresponding three parameters of the grid. These parameters are: voltage, speed/frequency, and phase angle. The aforementioned parameters are commonly not a consideration until the turbomachine reaches full-speed-no-load (FSNL). Here, the phase angle is an uncontrolled variable during the sync process. This leads to a wide variation in the time required to synchronize. In addition, an undesired transient may occur when the breaker is closed due to the continued acceleration of the turbomachine. During the start-up process the turbomachine follows a particular acceleration schedule, which is generally dependent on physical parameters, such as, but not limiting of, thermal transients, exhaust temperature, airflow, etc.

There are a few issues with the current synchronization process. In some applications, such as, but not limiting of, Fast Start or Rapid Response, variations in synchronization process time may be unacceptable. This may prevent the powerplant from meeting operational requirements.

Therefore, there is a desire for an improved synchronization process. The improved process should reduce the power transient currently experienced during the synchronization process. The method should also reduce the variations in synchronization process times when the turbomachine is operating in a Normal Mode or a Fast Start Mode. This method should also provide a more consistent and repeatable synchronization process.

BRIEF DESCRIPTION OF THE INVENTION

In an embodiment of the present invention, a method of reducing the time to synchronize a turbomachine generator with an electrical grid system, the method comprising: determining a voltage value of a grid system; wherein a generator is integrated with a turbomachine and is configured for exporting electricity to the grid system; and wherein the generator comprises a generator field; applying a target bias to the voltage value; wherein the target bias assists the generator with delivering a positive voltage to the grid system; conditioning the voltage value; wherein the conditioning increases an accuracy of the voltage value; determining a voltage target for the generator, wherein an exciter transforms the voltage value into the voltage target; and conditioning the voltage target to determine if the voltage target is within a preferred range; wherein the method allows the exciter to precondition a generator voltage regulator with the voltage target in preparation for synchronization as the turbomachine is accelerating to a synchronization speed.

In an alternate embodiment of the present invention, a method of reducing the time to synchronize a turbomachine generator with an electrical grid system, the method comprising: providing a generator integrated with a turbomachine, wherein the generator is configured for exporting electricity to a grid system and comprises a generator field; controlling a speed loop, wherein the speed loop performs the steps of: determining a grid speed, wherein the speed corresponds to a frequency of the grid system; applying a speed target bias to the grid speed; wherein the speed target bias assist with matching a rotor speed with the grid speed before the synchronization process commences; conditioning the grid speed to determine if the grid speed is within a preferred range; and generating a rotor speed command based on the grid speed, wherein the rotor speed command is used to adjust the rotor speed; and controlling a phase loop, wherein the speed loop performs the steps of: utilizing a target phase algorithm to determine a rotor acceleration adjustment bias, wherein the target phase algorithm, performs at least one of the following steps: determining a phase difference between the grid system and the generator; determining a grid speed, wherein the grid speed corresponds to a frequency of the grid system; determining a grid acceleration; wherein the grid acceleration corresponds to an acceleration of a frequency of the grid system; determining the rotor speed, wherein the rotor speed corresponds to a frequency of a rotor of the generator; and determining a rotor acceleration; wherein the rotor acceleration corresponds to an acceleration of the rotor of the generator; wherein the rotor acceleration adjustment bias is used to adjust the rotor acceleration; wherein the method adjusts a speed and an acceleration of the rotor to support a rapid synchronization as the turbomachine is accelerated to a synchronization speed.

In an another alternate embodiment of the present invention, a method of reducing the time to synchronize a turbomachine generator with an electrical grid system, the method comprising: providing a generator integrated with a turbomachine, wherein the generator is configured for exporting electricity to a grid system and comprises a generator field; controlling a speed loop, wherein the speed loop performs the steps of: determining a grid speed, wherein the speed corresponds to a frequency of the grid system; applying a speed target bias to the grid speed; wherein the speed target bias assist with matching a rotor speed with the grid speed before the synchronization process commences; conditioning the grid speed to determine if the grid speed is within a preferred range; and generating a rotor speed command based on the grid speed, wherein the rotor speed command is used to adjust the rotor speed; and controlling a phase loop, wherein the speed loop performs the steps of: utilizing a target phase algorithm to determine a rotor acceleration adjustment bias, wherein the target phase algorithm, performs at least one of the following steps: determining a phase difference between the grid system and the generator; determining a grid speed, wherein the grid speed corresponds to a frequency of the grid system; determining a grid acceleration; wherein the grid acceleration corresponds to an acceleration of a frequency of the grid system; determining a rotor speed, wherein the rotor speed corresponds to a frequency of a rotor of the generator; and determining a rotor acceleration; wherein the rotor acceleration corresponds to an acceleration of the rotor of the generator; wherein the rotor acceleration adjustment bias is used to adjust the rotor acceleration; wherein the phase loop adjusts a speed and an acceleration of the rotor to allow for a rapid synchronization as the turbomachine is accelerated to a synchronization speed; and controlling a voltage loop, wherein the speed loop performs the steps of determining a voltage target of the generator field in preparation for the synchronization process; wherein the steps comprise: determining a voltage value of the grid system; applying a target bias to the voltage value; wherein the target bias assists with delivering a positive voltage to the grid system during a synchronization process; conditioning the voltage value wherein the conditioning increases the accuracy of the voltage value; determining a voltage target for the generator, wherein an exciter transforms the voltage value into the voltage target; and conditioning the voltage target to determine if the voltage target is within a preferred range; wherein the voltage loop allows the exciter to precondition a generator voltage regulator with the voltage target in preparation for synchronization as the turbomachine is accelerating to a synchronization speed.

DETAILED DESCRIPTION OF THE INVENTION

Figure 1:
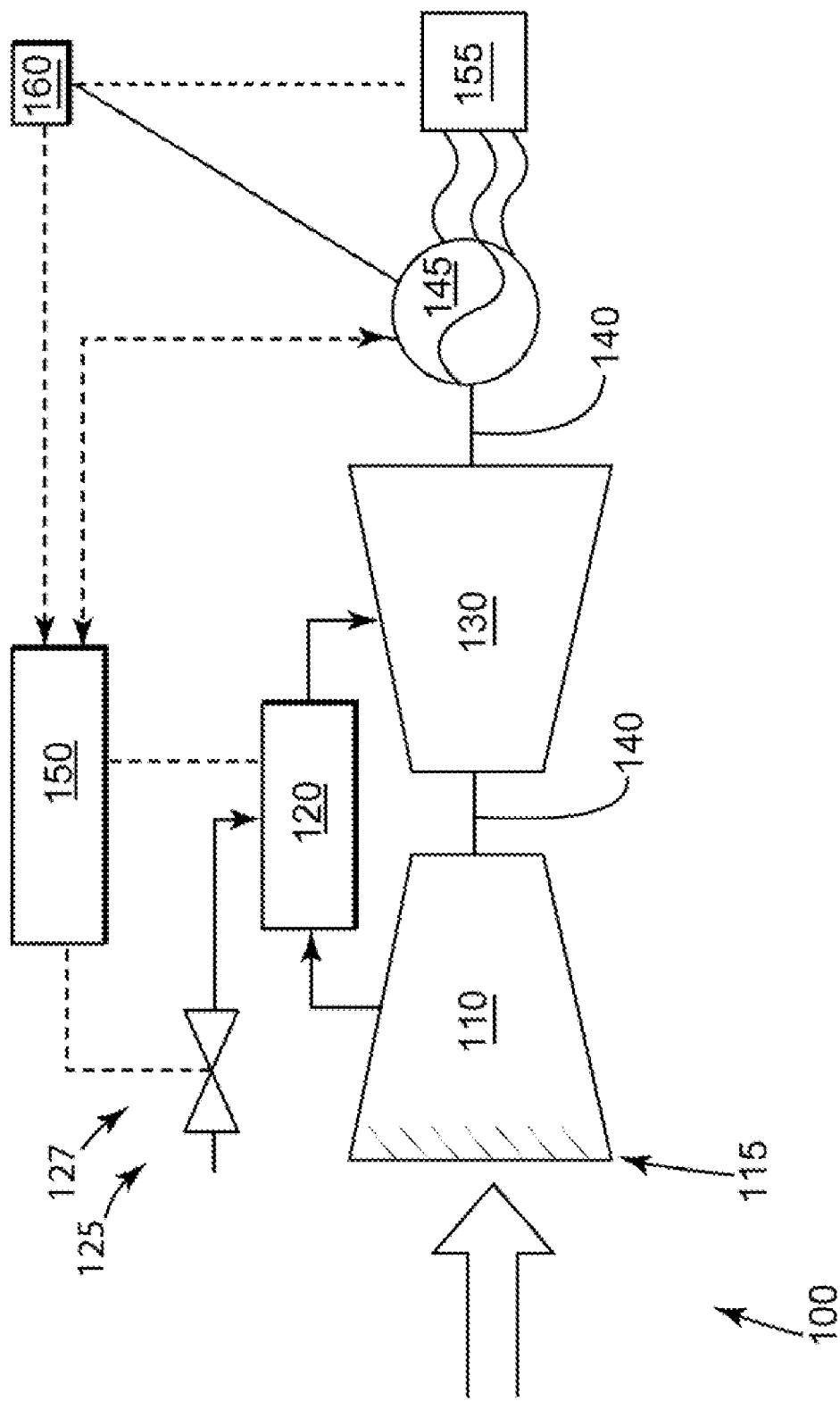
FIG. 1 is a schematic illustrating an environment within which a known method of starting a turbomachine operates.

The present invention has the technical effect of reducing the time associated with a synchronization process of a generator integrated with a powerplant machine. Embodiments of the present invention may actively adjust the acceleration of a rotor of the powerplant machine, to optimally control the phase angle differential between the generator and the grid. This may facilitate a consistently faster synchronization time. Embodiments of the present invention may serve to consistently reduce the power transient commonly associated with the synchronization process.

An embodiment of the present invention may seek to match the generator and grid voltages before the powerplant machine reaches the grid matching speed during the start-up process. An embodiment of the present invention may provide a predictive algorithm, or the like, to control the acceleration rate of the powerplant machine to target a particular phase angle differential between the powerplant machine and the grid when the powerplant machine reaches the grid matching speed. Here, the phase angle difference may be targeted such that the generator breaker may be closed immediately after the powerplant machine accelerates beyond the grid matching speed. This may avoid the generator experiencing a phase angle differential, which may add to the power transient associated with the breaker closure.

Although embodiments of the present methodology are described in relation to a powerplant machine a gas turbine, application of the present invention is not limited to a gas turbine. Embodiments of the present invention may be applied to other industrial machines integrated with a generator, which experiences a synchronization process to a grid. This other industrial machines may include, but are not limited to: steam turbines, reciprocating engines, aero-derivate gas turbines, or the like.

Embodiments of the present invention may be applied to a gas turbine operating in a variety of modes, such as, but not limiting of: a Normal Mode, a Fast Start Mode, Rapid Response or the like. As discussed, "Fast Start" or "Rapid Response" may be considered an operating mode of a powerplant machine. This mode generally requires the powerplant machine to export a load, while operating in emissions compliance, within a certain time after a start of that powerplant machine is initiated. As used herein, the terms Fast Start or Rapid Response are intended to include all such modes and equivalents thereof within the scope of this invention.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

Referring now to the FIGS., where the various numbers represent like parts throughout the several views. FIG. 1 is a schematic illustrating an environment within which a known method of starting a turbomachine operates. In FIG. 1, a turbomachine 100, in the form of a gas turbine, includes: a compressor section 110; a combustion system 120; a fuel supply system 125; a turbine section 130; a rotor 140; and a turbine control system 150. The combustion system 120 may receive a fuel from a fuel circuit 127 of the fuel system 125. Embodiments of the fuel system 125 may comprise multiple fuel circuits 127.

Generally, the compressor section 110 includes a plurality of inlet guide vanes (IGVs) 115 and a plurality of rotating blades and stationary vanes structured to compress an ingested air, illustrated by the large arrow in FIG. 1. Within the combustion system 120, the compressed air and fuel are mixed, ignited, and create a working fluid.

The working fluid generally proceeds downstream from the combustion system 120 to the turbine section 130. The turbine section 130 includes a plurality of rotating and stationary components (neither of which are illustrated). These components may be positioned about a rotor 140 and function to convert the working fluid to a mechanical torque, which may be used to drive the compressor section 110 and the generator 145 integrated with the gas turbine 100 via the rotor 140.

Operationally, known methods of starting-up the gas turbine 100 involve the following steps. A starting means, such as, but not limiting of, a Load Commutated Inverter (LCI) accelerates the gas turbine 100 to a predefined purge speed. After the purge is complete, the starting means decelerates the gas turbine 100 to a predefined ignition speed. At this ignition speed, valves of the combustion system 120 and the fuel circuit 127 are modulated to a predefined position for ignition fuel flow, controlled under an open loop fuel flow philosophy. After ignition and a pre-defined warm-up timer expires, the starting means and the control system 150 cooperatively accelerate the gas turbine 100 to a primary operating speed, such as, but not limiting of, FSNL.

Under known methods at FSNL, the control system 150 communicates a with an excitation system 160 (hereinafter "exciter"). The exciter 160 and the control system 150 cooperatively operate to perform a synchronization process. This process cumulates with the closure of a generator breaker (not illustrated), which electrically connects the generator 145 with the grid 155.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. The such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

Figure 2:
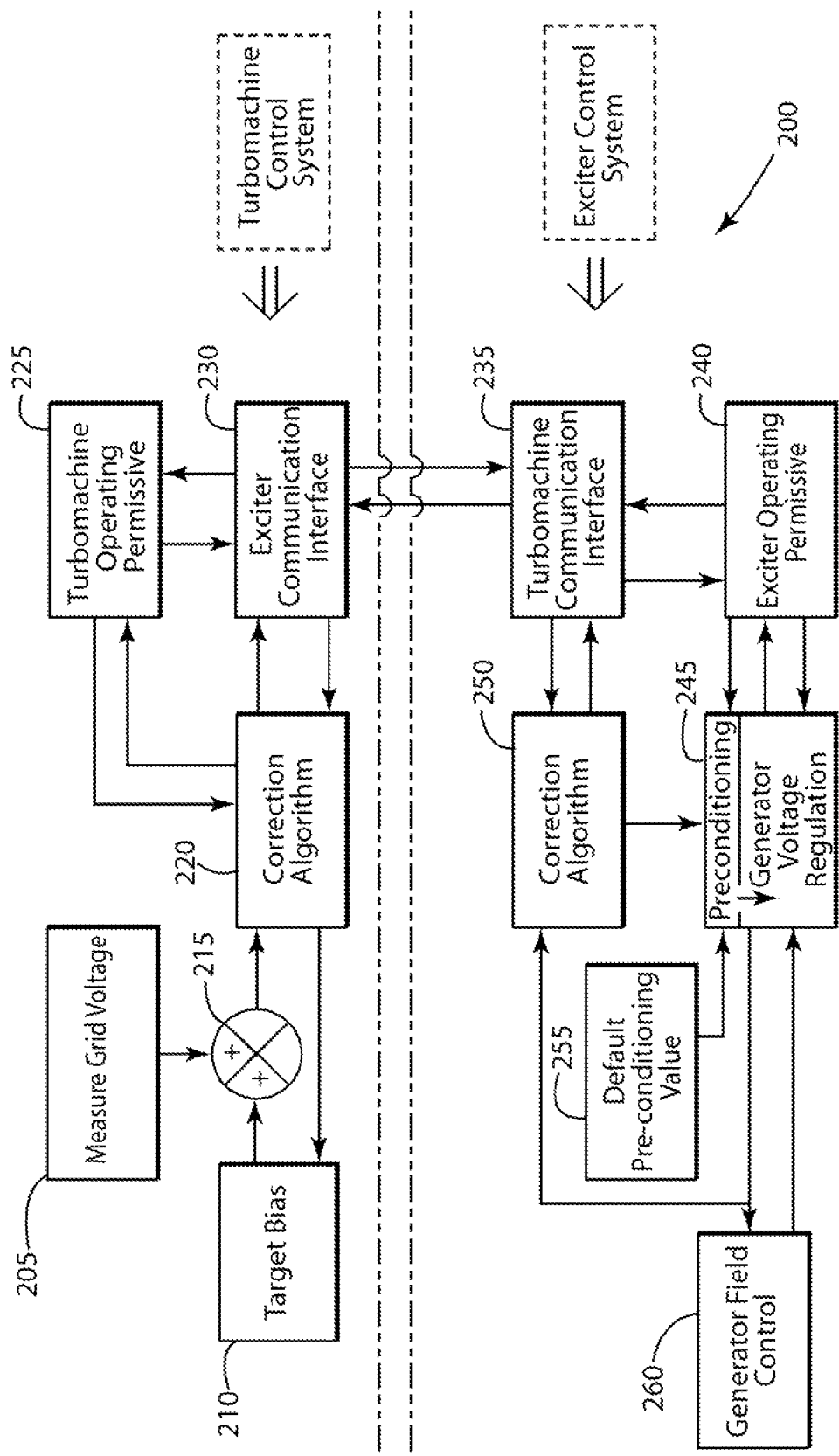
FIG. 2 is a process diagram illustrating algorithms of a method of actively controlling generator voltage in preparation for the synchronization process, in accordance with an embodiment of the present invention.

FIG. 2 is a process diagram illustrating algorithms of a method 200 of actively controlling generator voltage in preparation for the synchronization process, in accordance with an embodiment of the present invention. The embodiments of the method 200 described herein may be applied to a turbomachine control system cooperatively functioning with an exciter control system. Collectively these systems may actively control a target voltage of a generator field prior to the synchronization process. Here, steps 205-230 may be performed or directly controlled by the turbomachine control system; and steps 235-260 may be performed or directly controlled by the exciter control system.

In step 205, the method 200 may determine the voltage of the grid. Here, in an embodiment of the present invention the turbomachine control system may be integrated with a device that measures the grid voltage.

In step 210, the method 200 may determine a target bias to be applied to the grid voltage of step 205. The bias may assist the generator with exporting a positive voltage to the grid and the generator breaker is closed. In an embodiment of the present invention, the target bias may be a preset value. In an alternate embodiment of the present invention, the turbomachine control system may calculate an appropriate value for the target bias, based in part of the current grid parameters. As discussed, the grid parameters may include, but are not limited to: frequency, voltage, and phase angle.

In step 215, the method 200 may use a summing junction, or the like, to add the target bias to the measured grid voltage. This sum may be considered a biased grid voltage, or the like.

In step 220, the method 200, may apply a correction algorithm, or the like, to the biased grid voltage. An embodiment of the correction algorithm may perform at least one of the following functions: error checking, filtering, and feedback. The goal of the error checking may include determining whether the biased grid voltage is within a volts/hertz range. This may ensure that the commanded voltage is not to high, which may adversely affect the generator; or to low, which may result in synchronizing to a grid operating below the normal operating frequency. The goal of the filtering may include determining whether the biased grid voltage is nearly uniform over a designated time frame. This may ensure that the grid voltage is not oscillating, which may indicate a grid stability issue. The goal of the feedback may include determining whether the value of the target bias is appropriate. Here, the correction algorithm may determine if the biased grid voltage is appropriate based on the current grid parameters. The correction algorithm may adjust the value of the biased grid voltage, based on the error correction and filtering steps.

As illustrated in FIG. 2, the correction algorithm may communicate the feedback directly to step 210, where the target bias is determined. In addition, in an embodiment of the present invention, the correction algorithm may simultaneously communicate the biased grid voltage to steps 225 and 230.

In step 225, the method 200 may determine whether a turbomachine operating permissive is satisfied. This permissive may be a requirement that should be satisfied before the method 200 may proceed. This permissive may include a requirement that the turbomachine is operating a mode that allows for a synchronization process. For example, but not limiting of, an auto-sync mode of the like.

In step 230, the method 200 may determine whether a communication link between the turbomachine control system and the exciter control system is established. This two-way communication link may be vital to the proper execution of the method 200 and the synchronization process. Therefore, the method 200 may determine whether the communication link is maintained during the execution of the method 200.

As illustrated in FIG. 2, an embodiment of the method 200 may provide communication between steps 225 and 230. This may confirm that the turbomachine control system is operating the turbomachine in a mode allowing for the synchronization process.

In an embodiment of the method 200, if the turbomachine operating permissive is not satisfied, then the method 200 may revert to step 205. In addition, if the exciter communication link is not established or maintained, then the method 200 may revert to step 205.

As discussed, in an embodiment of the present invention steps 235-260 of the method 200 may be performed or directly controlled by the exciter control system. In step 235, the method 200 may determine whether a communication link between the exciter control system and the turbomachine control system is established and maintained, similar to the functions described in relation to step 230.

In step 240, the method 200 may determine whether an exciter operating permissive is satisfied. This permissive may be a requirement that should be satisfied before the method 200 may proceed. This permissive may include a requirement that the exciter is operating a mode that allows for a synchronization process. For example, but not limiting of, an exciter mode, field flashing mode, or other mode focused on generating volts on the generator field.

In step 245, the method 200 may utilize a voltage regulation algorithm, which may be considered a generator voltage regulator. This algorithm may receive the biased measured voltage generated in step 220, which may be considered the target voltage for the generator field. An embodiment of this algorithm may comprise a proportional plus integrator loop (P+I), which may be used to automatically regulate the current field volts on the generator. Here, the algorithm may apply a preconditioning value, received from step 255, to efficiently start the regulation process. In an embodiment of the present invention the preconditioning value may be set to 100%. This may avoid the wind up and/or the ramp limit of the P+I if the preconditioning value is set to 0%.

In step 250, of the method 200, the target voltage may be received and evaluated by a correction algorithm, which may function similar to the same in step 220. An embodiment of the correction algorithm may perform at least one of the following functions: error checking, feedback, and filtering. The goal of the error checking may include determining whether the target voltage commanded by step 245 is within a volts/hertz range. This may ensure that the target voltage is not to high, which may adversely affect the generator; or to low, which may result in synchronizing to a grid operating below the normal operating frequency. The error checking may also determine if the exciter properly receives the value of the target voltage. Here, the correction algorithm may compare the value of the target voltage received from step 245, with the value of the target voltage received in step 235, which originated in step 220. The goal of the feedback may include determining whether the value of the target voltage received by the generator field control in step 260, is the same or similar to the same sent to the generator field control by the generator voltage regulator of step 245. The correction algorithm may also determine if the target voltage is appropriate based on the current grid parameters. The correction algorithm may adjust the value of the target voltage, based on the error correction and feedback steps.

As illustrated in FIG. 2, embodiments of the method 200 employ a closed loop process that continuously adjusts the target value of the generator voltage. This adjustment may occur before the turbomachine reaches the synchronization speed.

Figure 3:
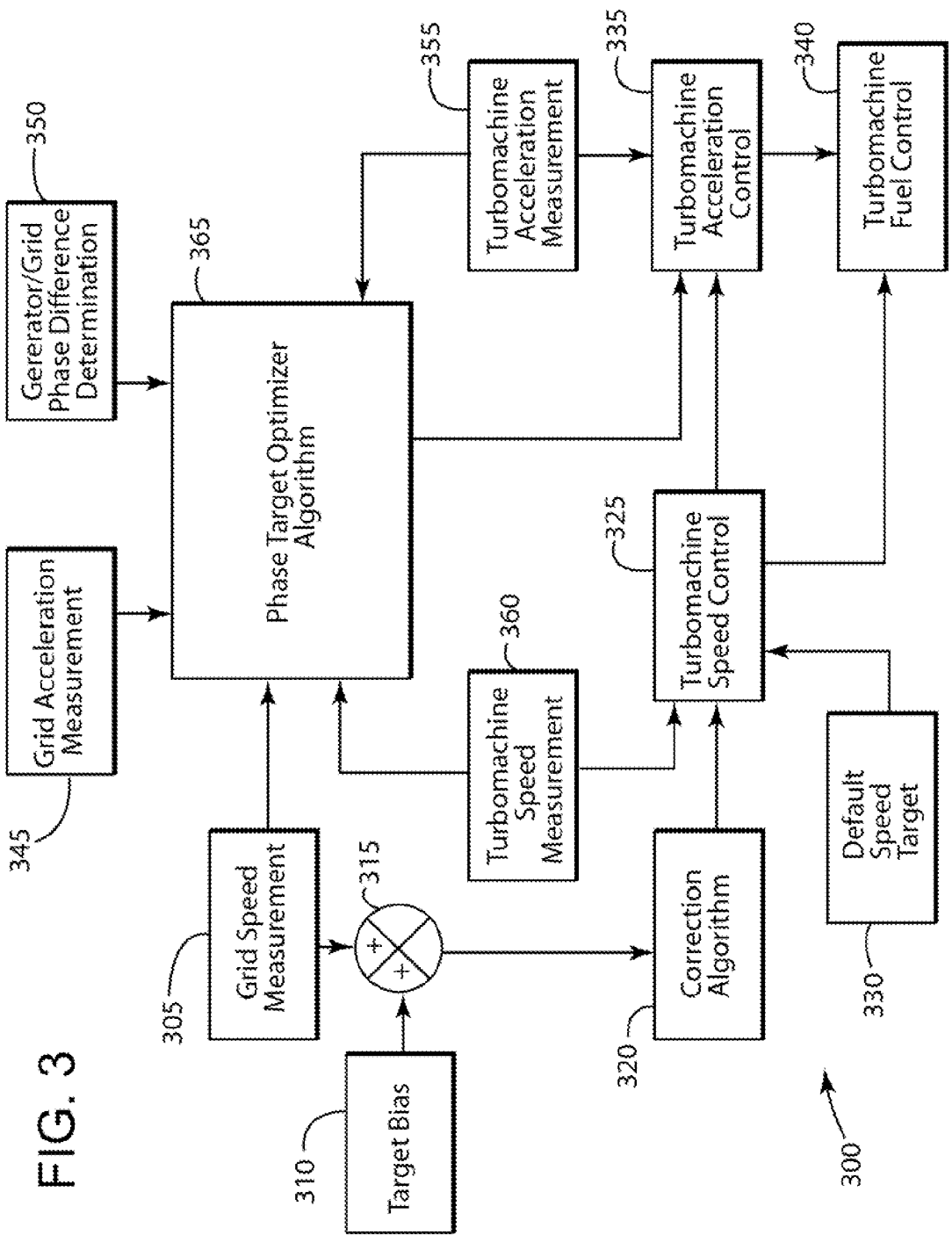
FIG. 3 is a process diagram illustrating algorithms of a method of actively controlling generator speed and phase angle in preparation for the synchronization process, in accordance with an embodiment of the present invention.

FIG. 3 is a process diagram illustrating algorithms of a method 300 of actively controlling generator speed and phase angle in preparation for the synchronization process, in accordance with an embodiment of the present invention. FIG. 3 illustrates two independent control loops that collectively function to adjust the speed control and acceleration control of the turbomachine, which, in turn, may adjust the fuel control of the turbomachine. The first control loop may be considered a speed loop and comprises steps 305-340. The second control loop may be considered an acceleration loop and comprises steps 305, 335, 340, and 345-365.

The following discussion focuses on the first control loop. In step 305, the method 300 may determine the speed of the grid. Here, in an embodiment of the present invention the turbomachine control system may be integrated with a device that measures the grid speed, which may be directly related to the grid frequency.

In step 310, the method 200 may determine a target bias to be applied to the grid speed of step 305. The bias may assist the rotor of generator with matching the speed of the grid and the generator breaker is closed. In an embodiment of the present invention the target bias may be a preset value. In an alternate embodiment of the present invention, the turbomachine control system may calculate an appropriate value for the target bias, based in part of the current grid parameters. As discussed, the grid parameters may include, but are not limited to: frequency, voltage, and phase angle.

In step 315, the method 300 may use a summing junction, or the like, to add the target bias to the measured grid speed. This sum may be considered a biased grid speed, or the like.

In step 320, the method 300, may apply a correction algorithm, or the like, to the biased grid speed. An embodiment of the correction algorithm may perform at least one of the following functions: error checking, filtering, and feedback. The goal of the error checking may include determining whether the biased grid speed is within a speed range. This may ensure that the commanded speed is not too high, which may lead to a high load transient; or to low, which may prevent synchronizing to the grid. The goal of the filtering may include determining whether the biased grid speed is nearly uniform over a designated time frame. This may ensure that the grid speed is not oscillating, which may indicate a grid stability issue. The correction algorithm may adjust the value of the biased grid speed, based on the error correction and filtering steps.

In step 325, the method 300 may determine the command for the speed of the turbomachine. Here, the method 300 may communicate the biased grid speed to an algorithm, such as, but not limiting of, the turbomachine speed control of the turbomachine control system.

The following discussion focuses on the second control loop. In step 345, the method 300 may determine the current grid acceleration. Here, in an embodiment of the present invention the turbomachine control system may be integrated with a device that measures the grid acceleration. The value of the grid acceleration may be communicated to the phase target optimizer, discussed in step 365.

In step 350, the method 300 may determine the current difference between the phase angles of the generator and the grid. Here, the method 300 may receive data on the phase angles from a device that measures the same. Then, the method 300 may calculate the difference between the phase angles and communicate to the phase target optimizer.

In step 355, the method 300 may determine the current acceleration of the turbomachine. Here, in an embodiment of the present invention the turbomachine control system may be integrated with a device that measures the turbomachine acceleration.

In step 360, the method 300 may determine the current speed of the turbomachine. Here, in an embodiment of the present invention the turbomachine control system may be integrated with a device that measures the turbomachine speed.

In step 365, the method 300 may determine an adjustment bias for the acceleration of the turbomachine. Here, an algorithm configured to determine a phase angle target may determine the adjustment bias based on the data received from steps 345-360, as previously described. Next, the method 300 may communicate the adjustment bias to the turbomachine acceleration control of step 335.

In steps 325-340, the method 300 may combine the biased grid speed target, generated by the speed loop, and the adjustment bias for the acceleration, generated by the phase angle loop. This combination may adjust the operation of the turbomachine machine via a change in the fuel stroke reference, or called for fuel.

In step 325, the method 300 may use an algorithm that combines that biased speed target of step 320, the current speed of step 360, and a default speed target of 330. In an embodiment of the present invention, the default speed target may be used if the method 300 determines that the biased speed target and/or the current speed appear to be erroneous. The algorithm may determine an appropriate speed command, which may be then communicated to steps 335 and 340, as illustrated in FIG. 3.

In steps 335, the method 300 may use an algorithm that combines that current acceleration of step 355, the speed command of step 325, and the acceleration adjustment bias of step 365. The algorithm may determine an appropriate acceleration command, which may be then communicated to steps 340, as illustrated in FIG. 3.

In step 340, the method 300 may determine the appropriate amount of fuel the turbomachine should consume during the start-up process. The fuel amount may adjust the speed and acceleration of the turbomachine rotor as the turbomachine accelerates to FSNL. This may allow for synchronization to occur as the turbomachine reaches the synchronization speed.

Embodiments of the present invention may provide many benefits. The exciter is engaged to match the generator voltage to the grid voltage, earlier than currently known method. This may assure that the generator voltage is matched when the synchronization speed match is reached.

Embodiments of the present invention may employ a predictive algorithm and/or model to predict the phase angle difference between the grid and the generator. Then, an algorithm adjusts the acceleration of the machine, with the aim of targeting a particular phase difference at a certain time or machine speed.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention arc not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of reducing the time to synchronize a turbomachine generator with an electrical grid system, the method comprising:
   determining a voltage value of a grid system; wherein a generator is integrated with a turbomachine and is configured for exporting electricity to the grid system; and wherein the generator comprises a generator field;
   applying a target bias to the voltage value; wherein the target bias assists the generator with delivering a positive voltage to the grid system;
   conditioning the voltage value; wherein the conditioning increases an accuracy of the voltage value;
   determining a voltage target for the generator, wherein an exciter transforms the voltage value into the voltage target; and
   conditioning the voltage target to determine if the voltage target is within a preferred range;
   wherein the method allows the exciter to precondition a generator voltage regulator with the voltage target in preparation for synchronization as the turbomachine is accelerating to a synchronization speed.

2. The method of claim 1 further comprising a step of adjusting a speed of the turbomachine in preparation for the synchronization process, wherein the step comprises controlling a speed loop and a phase loop.

3. The method of claim 2, wherein the speed loop performs the steps of:
   determining a grid speed, wherein the speed corresponds to a frequency of the grid system;
   applying a speed target bias to the grid speed; wherein the speed target bias assists with matching a rotor speed with the grid speed before the synchronization process commences;
   conditioning the grid speed to determine if the grid speed is within a preferred range; and
   generating a rotor speed command based on the grid speed, wherein the rotor speed command is used to adjust the rotor speed.

4. The method of claim 2, wherein the phase loop performs the steps of:
   utilizing a target phase algorithm to determine a rotor acceleration adjustment bias, wherein the target phase algorithm performs at least one of the following steps:
      determining a phase difference between the grid system and the generator;
      determining a grid speed, wherein the grid speed corresponds to a frequency of the grid system;
      determining a grid acceleration; wherein the grid acceleration corresponds to an acceleration of a frequency of the grid system;
      determining a rotor speed, wherein the rotor speed corresponds to a frequency of a rotor of the generator; and
      determining a rotor acceleration; wherein the rotor acceleration corresponds to an acceleration of the rotor of the generator;
   wherein the rotor acceleration adjustment bias is used to adjust the rotor acceleration.

5. The method of claim 2, wherein the step of conditioning the voltage value; further comprises the steps of:
   determining whether the voltage value is within an upper volts per hertz range;
   determining whether the voltage value is within a lower volts per hertz range;
   determining if data on the voltage value requires a filtering process to reduce an unacceptable variance between the data; and
   determining whether the target bias requires an adjustment.

6. The method of claim 5 further comprising the step of determining whether a turbomachine operating permissive is satisfied.

7. The method of claim 6 further comprising the step of determining whether communication with an exciter interface is maintained.

8. The method of claim 5 further comprising the step of transmitting the voltage target of the generator voltage regulator controller to a controller of the generator field.

9. A method of reducing the time to synchronize a turbomachine generator with an electrical grid system, the method comprising:
   providing a generator integrated with a turbomachine, wherein the generator is configured for exporting electricity to a grid system and comprises a generator field;
   controlling a speed loop, wherein the speed loop performs the steps of:
      determining a grid speed, wherein the speed corresponds to a frequency of the grid system;
      applying a speed target bias to the grid speed; wherein the speed target bias assist with matching a rotor speed with the grid speed before the synchronization process commences;
      conditioning the grid speed to determine if the grid speed is within a preferred range; and
      generating a rotor speed command based on the grid speed, wherein the rotor speed command is used to adjust the rotor speed; and
   controlling a phase loop, wherein the speed loop performs the steps of:
      utilizing a target phase algorithm to determine a rotor acceleration adjustment bias, wherein the target phase algorithm, performs at least one of the following steps:
         determining a phase difference between the grid system and the generator;
         determining a grid speed, wherein the grid speed corresponds to a frequency of the grid system;
         determining a grid acceleration; wherein the grid acceleration corresponds to an acceleration of a frequency of the grid system;
         determining the rotor speed, wherein the rotor speed corresponds to a frequency of a rotor of the generator; and
         determining a rotor acceleration; wherein the rotor acceleration corresponds to an acceleration of the rotor of the generator; wherein the rotor acceleration adjustment bias is used to adjust the rotor acceleration;
   wherein the method adjusts a speed and an acceleration of the rotor to support a rapid synchronization as the turbomachine is accelerated to a synchronization speed.

10. The method of claim 9 further comprising steps of controlling a voltage target of the generator field in preparation for the synchronization process; wherein the steps comprise:
   determining a voltage value of the grid system;

applying a target bias to the voltage value; wherein the target bias assists the generator with delivering a positive voltage to the grid system;

conditioning the voltage value; wherein the conditioning increases the accuracy of the voltage value;

determining a voltage target for the generator, wherein an exciter transforms the voltage value into the voltage target; and conditioning the voltage target to determine if the voltage target is within a preferred range;

wherein the method allows the exciter to precondition a generator voltage regulator with the voltage target in preparation for synchronization as the turbomachine is accelerating to a synchronization speed.

11. The method of claim 9, wherein the step of conditioning the grid speed further comprises the steps of:

determining whether the grid speed is within an upper volts per hertz range;

determining whether the grid speed is within a lower volts per hertz range;

determining if data on the grid speed requires a filtering process to reduce an unacceptable variance between the data; and generating a speed command for adjusting the rotor speed.

12. The method of claim 10 further comprising the step of determining whether a turbomachine operating permissive is satisfied.

13. The method of claim 12 further comprising the step of determining whether communication with an exciter interface is maintained.

14. The method of claim 13 further comprising the step of transmitting the voltage target of the generator voltage regulator to a controller of the generator field.

15. The method of claim 14, wherein the rotor acceleration adjustment bias is used to adjust the rotor acceleration.

16. The method of claim 14, wherein the speed command is used to adjust the rotor speed.

17. A method of reducing the time to synchronize a turbomachine generator with an electrical grid system, the method comprising:

providing a generator integrated with a turbomachine, wherein the generator is configured for exporting electricity to a grid system and comprises a generator field;

controlling a speed loop, wherein the speed loop performs the steps of:

determining a grid speed, wherein the speed corresponds to a frequency of the grid system;

applying a speed target bias to the grid speed; wherein the speed target bias assist with matching a rotor speed with the grid speed before the synchronization process commences;

conditioning the grid speed to determine if the grid speed is within a preferred range; and generating a rotor speed command based on the grid speed, wherein the rotor speed command is used to adjust the rotor speed; and controlling a phase loop, wherein the speed loop performs the steps of:

utilizing a target phase algorithm to determine a rotor acceleration adjustment bias, wherein the target phase algorithm, performs at least one of the following steps:

determining a phase difference between the grid system and the generator;

determining a grid speed, wherein the grid speed corresponds to a frequency of the grid system;

determining a grid acceleration; wherein the grid acceleration corresponds to an acceleration of a frequency of the grid system;

determining a rotor speed, wherein the rotor speed corresponds to a frequency of a rotor of the generator; and determining a rotor acceleration; wherein the rotor acceleration corresponds to an acceleration of the rotor of the generator; wherein the rotor acceleration adjustment bias is used to adjust the rotor acceleration;

wherein the phase loop adjusts a speed and an acceleration of the rotor to allow for a rapid synchronization as the turbomachine is accelerated to a synchronization speed; and controlling a voltage loop, wherein the speed loop performs the steps of determining a voltage target of the generator field in preparation for the synchronization process; wherein the steps comprise:

determining a voltage value of the grid system;

applying a target bias to the voltage value; wherein the target bias assists with delivering a positive voltage to the grid system during a synchronization process;

conditioning the voltage value wherein the conditioning increases the accuracy of the voltage value;

determining a voltage target for the generator, wherein an exciter transforms the voltage value into the voltage target; and conditioning the voltage target to determine if the voltage target is within a preferred range;

wherein the voltage loop allows the exciter to precondition a generator voltage regulator with the voltage target in preparation for synchronization as the turbomachine is accelerating to a synchronization speed.

18. The method of claim 17 further comprising the step of transmitting the voltage target of the generator voltage regulator to a controller of the generator field.

19. The method of claim 17 further comprising the step of transmitting the rotor acceleration adjustment bias to a controller that determines the rotor acceleration.

20. The method of claim 17 further comprising the step of transmitting the speed command to a controller that determines the rotor speed.

* * * * *